Nov. 21, 1933.  D. R. YARNALL  1,935,899

SPRING PRESSED VALVE PACKING

Filed Nov. 23, 1931

Witnesses

Inventor
David Robert Yarnall,
by Attorneys

Patented Nov. 21, 1933

1,935,899

UNITED STATES PATENT OFFICE 1,935,899

SPRING PRESSED VALVE PACKING

David Robert Yarnall, Philadelphia, Pa., assignor to Yarnall-Waring Company, Philadelphia, Pa., a corporation of Pennsylvania Application November 23, 1931
Serial No. 576,670

7 Claims. (Cl. 251—80)

My invention relates to valves, and more particularly to valves of the blow-off class and of the seatless type wherein a hollow apertured plunger is withdrawn past the inlet opening to permit discharge.

A purpose of my invention is to provide a valve adapted to stay tight under very high pressures.

A further purpose is to provide a valve of the general character indicated whose packing is continually under spring pressure.

A further purpose is to design the opening and closing plunger sleeve that it assists in holding the valve to closure when in the closed position and to more firmly seat the packing at that time.

A further purpose is to provide a condensing chamber between the valve and the stem packing and to connect the chamber to a distant point of discharge.

A further purpose is to provide a conical seat of metal having a co-fitting metallic valve member adapted to close upon the seat.

Further purposes will appear in the specification and in the claims.

I have preferred to illustrate my invention in but one main form, selecting a form which is practical, efficient and thoroughly reliable and which at the same time well illustrates the principles involved.

Like numerals refer to like parts in all figures.

Figure 1:
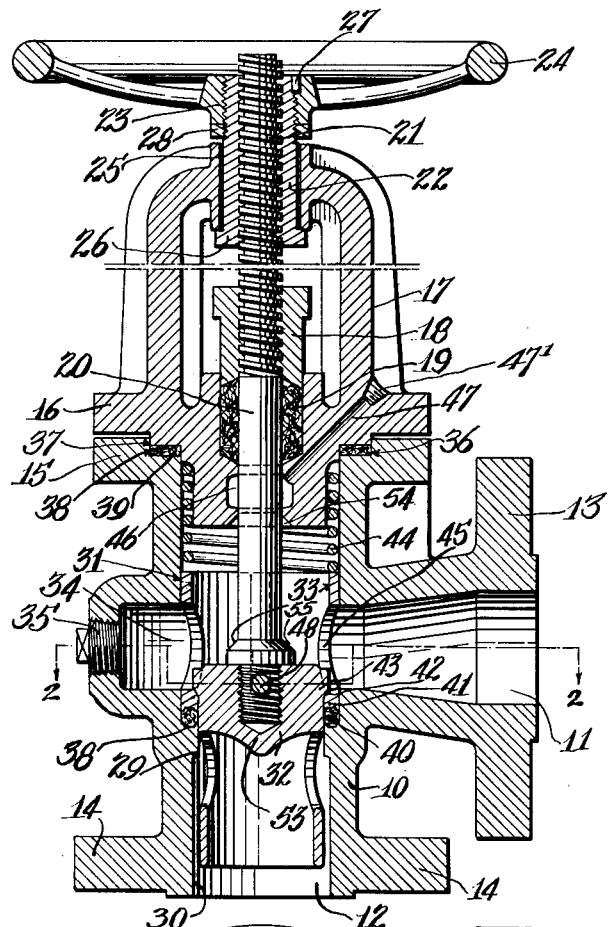
Figure 1 is a sectional elevation through my improved valve.

Describing in illustration and not in limitation and referring to the drawing:—

The valve body 10 is provided with the usual inlet 11, outlet 12 and inlet and outlet flanges 13 and 14 as well as top flange 15 with which the flange 16 of the yoke 17 is intended to cooperate, permitting the yoke to be forced down into the valve by means of the usual bolts.

The yoke is provided with a gland 18 and packing 19 for a stem 20. The stem is threaded at its upper end at 21 through the journal nut 22 fastened in the hub 23 of the hand wheel 24. The journal nut rotates within an opening 25 in the top of the yoke and is held from longitudinal movement by the shoulder 26 upon the nut at the bottom and the wheel hub 23 at the top. The latter is screwed upon the upper part of the nut and is also keyed to it as at 27. A washer 28 is shown between the wheel hub and the yoke.

The mechanism shown operates by rotation of the hand wheel and nut without rotating the stem, but this illustration will be recognized as one only of a number of stem-operating means that might be used.

The interior of the body has an intermediate constricted portion at 29, bored at 30 and counterbored at 31 for the passage of a movable valve member 32 and to receive a shell 33, respectively.

The hollow interior of the body is enlarged laterally at 34 to give free passage around the shell, for core support during casting, and for convenience of access for cleaning. This space is accessible through an opening normally closed by the removable plug 35 and through the inlet 11.

A yoke 17 fits at 36 into the bore 31 and at 37 into a bore 38. An annular packing ring 39 has an inner peripheral diameter the same as the bore 30, and an outer peripheral diameter to fit into the bore 38, and is interposed between the yoke 17 and the valve body portion 10 before these two sections are bolted together.

The differences in diameters between the bores 30 and 31 cause an annular shoulder 38 to be formed, and this shoulder forms a seat for an annular packing ring 40.

The lower end of the shell 33 is internally thickened at 41 and provides a conical shoulder stop 42 for the head 43 of the valve plug and for wider engagement with the packing ring 40 held between it and the annular shoulder 38.

Resting upon the underside of the yoke 17, and surrounding a restricted portion at the bottom of the yoke, I provide a coil spring 44, the lower free end of which rests on, and continuously exerts pressure upon the upper face of the shell 33, resulting in a continuous yielding pressure upon the packing ring 40.

The shell 33 is apertured at 45 and leakage is prevented upwardly (when the valve is in the closed position as illustrated) by the annular packing ring 39, and downwardly by the annular packing ring 40. Leakage around the stem is prevented by the packing 19 and the surface of the movable plug is engaged by and seals against the packing ring 40.

Where a gas or vapor is to be controlled I further provide a condensing chamber 46 surrounding the stem 20 and located within the yoke casting, slightly above the bottom of the casting, and below the packing 19. Most of the gas or vapor which finds its way upward along the face of the stem 20 is trapped within the condensing chamber before it can come in contact with the packing 19 and may be drawn off through a vent 47. Provision for pipe connection is shown at the outward end of this vent 47', in order that seepage can be conveyed to any desired point.

Figure 2:
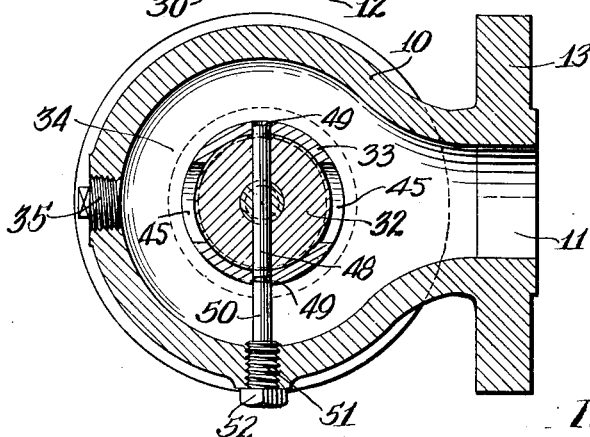
Figure 2 is a sectional plan view taken on the line 2—2 of Figure 1.

The shell and valve plug are prevented from relative turning, as by the pin 48 (clearly shown in Figure 2) passing through the valve plug and extending outwardly from each side and projecting into grooves 49 in the shell.

Rotation of the shell within the body of the valve is prevented by a pin 50 threaded into the body at 51, accessible on the outside by a head 52 and fitting into one of the grooves 49 in the shell.

The upper end of the hollow valve plug is formed as shown at 53 to facilitate flow of fluid through the valve by easy lines.

The valve has not only the usual provision for tightening the annular packing 40 by screwing down the yoke, but permits the tightening of the packing 40 every time that the valve is closed, and to any desired extent, by turning the hand wheel to force the plug against the tapered shoulder forcing the shell 32 down upon the packing 40 and tightening the contact between the packing and its seat, and between the packing and the movable valve member 32.

In opening the valve, any tendency of the shell 32 sticking to the tapered shoulder 42, resulting in the loosening of the packing 40 from its seat, is prevented by the spring 44 exerting continuous pressure upon the shell 33 assuring the separation of the shell 33 from the head about the tapered engaging face 42.

In the extreme bottom of the yoke casting 17 I provide a conical seat 54, adapted to receive a correspondingly shaped enlargement 55 upon the stem 20. When the valve is in the open position this enlargement fits within the conical seat forming a further packing means for the prevention of the escape of fluid pressure.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new, and desiring to secure by Letters Patent is:—

1. In a seatless valve, a valve body having a bore and a counterbore forming between them a packing space, a packing within the space, a sleeve within the counterbore bearing upon the packing, laterally apertured for fluid inlet and providing fluid outlet through the sleeve and the bore, a plug valve within the sleeve and bore, means for lifting and lowering the valve, a yoke mounted upon the body, supporting the valve operating means, a second packing between the yoke and body and a spring within the counterbore pressing against the sleeve and yoke to hold the sleeve against the first packing.

2. In a seatless valve, a valve body having a bore and a counterbore forming between them a packing space, a packing within the space, a sleeve within the counterbore bearing upon the packing, laterally apertured for fluid inlet and providing fluid outlet through the sleeve and the bore, a plug valve, within the sleeve and bore, adapted in closed position to engage the sleeve and through it to compress the packing, means for lifting and lowering the valve, a yoke mounted upon the body, supporting the valve operating means, a second packing between the yoke and body and a spring within the counterbore pressing against the sleeve and yoke to hold the sleeve against the first packing.

3. A seatless valve, comprising a valve body having an outlet bore and a counterbore, a sleeve within the counterbore, apertured to allow fluid flow through an inlet in the valve body, packing compressed by the sleeve, a yoke-supported plug valve movable in the sleeve and engaging the packing, means for moving the plug valve with respect to the yoke, and a compression spiral spring between the yoke and sleeve holding the sleeve against its packing.

4. In a seatless valve, an axially bored and counterbored valve body having a lateral inlet, a sleeve within the counterbore of the body and having a lateral aperture in alignment with said inlet, guiding means between the sleeve and body to prevent turning of the sleeve, packing engaged by the sleeve, a plug valve movable axially with respect to the packing and engaging the packing, and guiding means between the plug valve and sleeve above the packing to prevent rotation of the plug valve, a yoke for the valve body, a valve stem for the plug valve, passing through the yoke, means mounted upon the yoke for longitudinally moving the stem, and spiral spring pressure means engaging the yoke at one end and the sleeve at the other to press the sleeve against the packing.

5. In a pressure packed valve, a body having a bore and counterbore and a ledge for packing at the bottom of the counterbore, packing in the counterbore, an apertured sleeve fitting the counterbore for engaging the packing and having an interior flange, a spring engaging the upper end of the sleeve and a movable valve element having a head with an exterior flange of the head engaging the interior flange of the sleeve to form a seal when the valve is in the closed position.

6. In a seatless valve, a valve body having a longitudinal bore and a counterbore, packing between the bore and counterbore, a slotted sleeve within the counterbore, laterally apertured to admit fluid and discharge it through the bore of the valve body, means for pressing said sleeve against the packing, a plug valve movable within the sleeve and past the packing, and projections from the valve body and from the plug into the slot within the sleeve to prevent rotation of the sleeve and of the plug, the projection from the plug being movable longitudinally of the slot.

7. In a seatless valve, a valve body having a longitudinal bore and counterbore, packing betweeen the bore and counterbore, an oppositely grooved sleeve within the counterbore, laterally apertured to admit fluid and discharge it through the bore of the valve body, means for pressing said sleeve against the packing, a plug valve movable within the sleeve and past the packing, pin terminals extending from the plug movable within the grooves to prevent rotation of the plug, and pin means projecting from the valve body into one of the grooves.

DAVID ROBERT YARNALL.